(12) United States Patent
Sampath

(10) Patent No.: US 8,882,412 B2
(45) Date of Patent: Nov. 11, 2014

(54) ROTARY CUTTING TOOL HAVING PCD CUTTING TIP

(75) Inventor: Karthik Sampath, Pittsburgh, PA (US)

(73) Assignee: Kennametal Inc., Latrobe, PA (US)

( * ) Notice: Subject to any disclaimer, the term of this patent is extended or adjusted under 35 U.S.C. 154(b) by 736 days.

(21) Appl. No.: 13/105,408

(22) Filed: May 11, 2011

(65) Prior Publication Data

US 2012/0288337 A1 Nov. 15, 2012

(51) Int. Cl.
*B23B 51/06* (2006.01)
*B23B 51/02* (2006.01)

(52) U.S. Cl.
CPC ........... *B23B 51/02* (2013.01); *B23B 2226/275* (2013.01); *B23B 2251/046* (2013.01); *B23B 2222/88* (2013.01); *B23B 2226/315* (2013.01); *B23B 51/06* (2013.01)
USPC .............................. 408/230; 408/57; 408/144

(58) Field of Classification Search
CPC .. B23B 51/02; B23B 51/06; B23B 2226/315; B23B 2251/043; B23B 2251/046
USPC ...................................... 408/57, 59, 144, 230
See application file for complete search history.

(56) References Cited

U.S. PATENT DOCUMENTS

| | | | | |
|---|---|---|---|---|
| 5,478,176 | A * | 12/1995 | Stedt et al. ....................... | 408/59 |
| 5,580,196 | A * | 12/1996 | Thompson ..................... | 408/145 |
| 5,800,101 | A * | 9/1998 | Jindai et al. .................... | 408/230 |
| 5,807,041 | A | 9/1998 | Lindblom | |
| 6,652,203 | B1 * | 11/2003 | Risen, Jr. ........................ | 408/230 |
| 2004/0101379 | A1 * | 5/2004 | Mabuchi et al. ............... | 408/230 |
| 2009/0016832 | A1 * | 1/2009 | Onose et al. .................... | 408/230 |
| 2010/0150673 | A1 * | 6/2010 | Schneider et al. .............. | 408/59 |

FOREIGN PATENT DOCUMENTS

| | | | |
|---|---|---|---|
| CH | 665979 | A5 * | 6/1988 |
| DE | 102007062539 | A1 * | 6/2008 |
| GB | 2 387 561 | A | 10/2003 |
| JP | 55058907 | A * | 5/1980 |
| JP | 2005262348 | A * | 9/2005 |
| JP | 3146992 | U * | 12/2008 |
| JP | 2009190116 | A * | 8/2009 |

OTHER PUBLICATIONS

UK Intellectual Property Office, "Search Report", Sep. 10, 2012, 4 pp.

* cited by examiner

*Primary Examiner* — Daniel Howell
*Assistant Examiner* — Michael Vitale
(74) *Attorney, Agent, or Firm* — Larry R. Meenan, Esq.

(57) ABSTRACT

A cutting tool for performing hole-cutting operations on a workpiece when the cutting tool is rotated about a central longitudinal axis includes a generally cylindrical body having a first end structured to be mounted to a machine tool and an opposite second end structured to engage and perform cutting operations on the workpiece. A number of coolant passages are defined in the generally cylindrical body, each coolant passage of the number of coolant passages is disposed at a first helix angle relative to the central longitudinal axis. A number of flutes are formed in the generally cylindrical body, each flute of the number of flutes includes a first portion at or about the first end of the generally cylindrical body, a second portion at or about the second end of the generally cylindrical body, and a transition portion disposed therebetween. The first portion of each flute is disposed generally at the first helix angle relative to the central longitudinal axis, the second portion of each flute is disposed generally at a second helix angle relative the central longitudinal axis, and the transition portion of each flute is disposed generally at a third helix angle relative to the central longitudinal axis greater than the first helix angle.

6 Claims, 1 Drawing Sheet

ROTARY CUTTING TOOL HAVING PCD CUTTING TIP

BACKGROUND

1. Field of the Invention

The invention relates generally to rotary cutting tools and, more particularly, to cutting tools, such as drills, having polycrystalline-diamond (PCD) cutting tips. The invention further relates to a method for forming a cutting tool having a polycrystalline-diamond cutting tip.

2. Background Information

Polycrystalline-diamond (PCD) drills have historically been formed as straight fluted, facet point drills. More recently, veined PCD drills have been formed having helical flutes and more complex point geometries similar to solid carbide drills. One of the major uses of such highly engineered PCD drills is for drilling in composite materials, such as carbon fiber reinforced polymer (CFRP) titanium composites.

Drilling in titanium requires good coolant flow within the drill to control the heat generated during drilling. As veined PCD drills are commonly fabricated as a PCD nib and rod which are later brazed together, it is difficult to have through-coolant holes breaking out in the flank of the drill. Typically, coolant holes are formed in the PCD nib an EDM process (electric discharge machining) that is carried out after the nib has been brazed to the rod. Such EDM process is typically quite expensive due to necessary set-up and processing times. Additionally, known veined PCD drills commonly utilize a central coolant hole through the core of the drill which feeds the coolant holes formed in the nib via EDM. The presence of such a central coolant hole generally reduces the strength, and thus the durability of the drill, a critical aspect for drills used to drill titanium materials.

There is, therefore, room for improvement in cutting tools used for drilling CFRP-titanium, particularly in the manner coolant is supplied in such drills.

SUMMARY OF THE INVENTION

Such deficiencies in the prior art are addressed by embodiments of the invention which are directed to an improved rotary cutting tool incorporating an improved coolant hole design.

As one aspect of the invention, a cutting tool for performing hole-cutting operations on a workpiece when the cutting tool is rotated about a central longitudinal axis is provided. The cutting tool includes a generally cylindrical body having a first end structured to be mounted to a machine tool and an opposite second end structured to engage and perform cutting operations on the workpiece, at least a portion of the second end being formed from a PCD material. The cutting tool further includes a number of coolant passages defined in the generally cylindrical body, each coolant passage of the number of coolant passages disposed at a first helix angle relative to the central longitudinal axis; and a number of flutes formed in the generally cylindrical body, each flute of the number of flutes having: a first portion at or about the first end of the generally cylindrical body, a second portion at or about the second end of the generally cylindrical body, and a transition portion disposed therebetween. The first portion of each flute is disposed generally at the first helix angle relative to the central longitudinal axis, the second portion of each flute is disposed generally at a second helix angle relative the central longitudinal axis, and the transition portion of each flute is disposed generally at a third helix angle relative to the central longitudinal axis, and the third helix angle is greater than the first helix angle.

Each coolant passage of the number of coolant passages may include an opening disposed at or about the transition portion of a corresponding flute of the number of flutes.

The number of flutes may include two flutes and the number of coolant passages may include two coolant passages.

The first helix angle may comprise an angle of about 30 degrees. The third helix angle may comprise an angle of about 45 degrees. The second helix angle may comprise an angle in the range of about 15 degrees to about 20 degrees.

As another aspect of the invention, a method of forming a cutting tool is provided. The method includes: providing a PCD coated nib of material formed in the shape of a rotary cutting tip; brazing the nib onto a generally cylindrical rod member disposed about a central longitudinal axis, the generally cylindrical rod member having a number of coolant passages formed therein at a first helix angle relative to the central longitudinal axis; and grinding a number of differential flutes of varying helix angles with respect to the central longitudinal axis into the brazed cylindrical rod and nib, each differential flute being oriented such that a corresponding coolant passage of the number of coolant passages breaks out within a corresponding flute.

Each differential flute may include a first portion disposed at or about the first helix angle with respect to the central longitudinal axis, a second portion disposed at a second helix angle with respect to the central longitudinal axis, and a third portion disposed at third helix angle with respect to the central longitudinal axis. The third portion being disposed between the first and second portions along the central longitudinal axis and the third helix angle being greater than the first helix angle.

Each coolant passage of the number of coolant passages may break out into a respective flute of the number of differential flutes generally in the third portion of the respective flute.

Grinding each flute of the number of differential flutes may include: grinding a first portion at the first helix angle, grinding a third portion adjacent the first portion at a third helix angle, and grinding a second portion adjacent the third portion and opposite the first portion at a second helix angle, wherein the third helix angle is greater than the first portion. The first helix angle may comprise an angle of about 30 degrees. The third helix angle may comprise an angle of about 45 degrees. The second helix angle may comprise an angle in the range of about 15 degrees to about 20 degrees.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
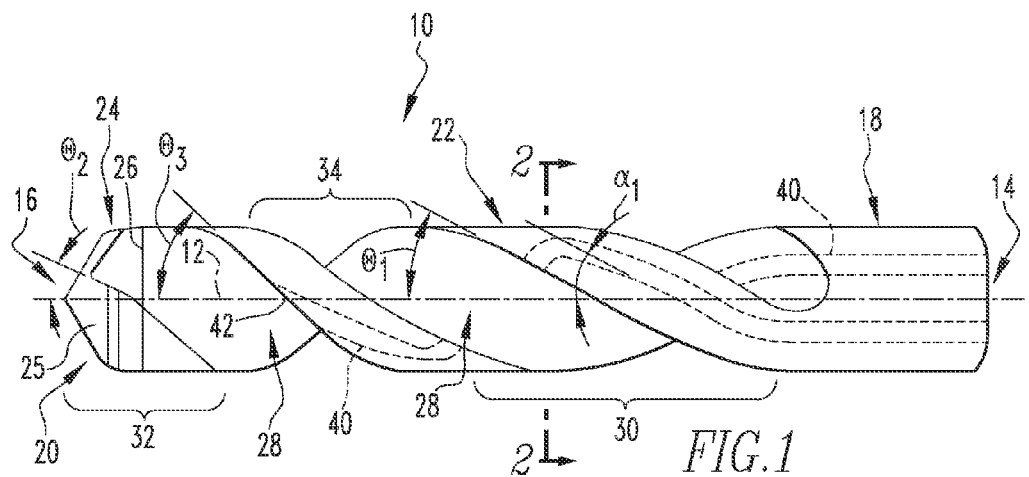
FIG. 1 is an elevational side view of a cutting tool in accordance with an example embodiment of the present invention.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

As used herein, the term "number" shall be used to refer to any non-zero quantity (i.e., one or any quantity greater than one).

As used herein, the term "about" shall be used to refer to a point near, or at, a particular identified point (i.e., proximate).

Figure 2:
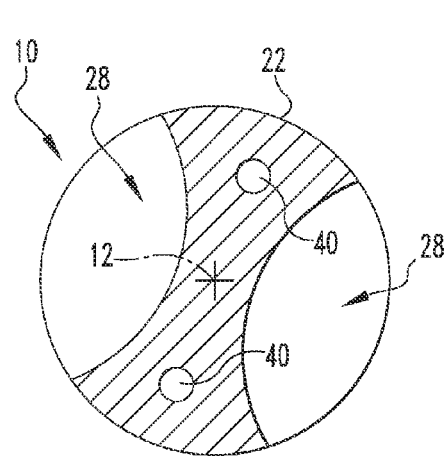
FIG. 2 is a cross-sectional view of the cutting tool of FIG. 1 taken along line 2-2 of FIG. 1.
Figure 3:
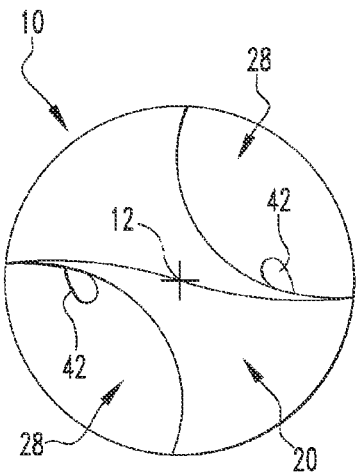
FIG. 3 is an elevational end view of the cutting tool of FIG. 1 looking down the longitudinal axis of the tool toward the second end.

FIGS. 1-3 depict an example cutting tool 10, in accordance with a non-limiting embodiment of the present invention, for conducting cutting operations on a workpiece (not shown) when cutting tool 10 is rotated about a central longitudinal axis 12. Although depicted as a drill in the exemplary embodiment described herein, it is to be appreciated that concepts described herein are applicable to other cutting tools such as, for example, without limitation, end mills or other rotary cutting tools that employ brazed tips.

Cutting tool 10 includes a first end 14 and an opposite second end 16. Cutting tool 10 further includes a mounting portion 18 disposed at or about first end 14 for mounting the cutting tool 10 in a chuck mechanism of a machine tool (not shown), a cutting tip 20 disposed generally at second end 16 for engaging and cutting a workpiece (not shown), and a body portion 22 of generally cylindrical shape disposed between the mounting portion 18 and cutting tip 20. Cutting tip 20 is generally formed from a carbide nib 24 having a PCD material 25 deposited thereon which is brazed via a suitable brazing process to body portion 22 at a braze joint 26. Preferably, body portion 22 is likewise formed from a similar carbide material.

Cutting tool 10 further includes a number of flutes 28 (two in the illustrated example) provided in body portion 22. Each flute 28 includes a first portion (shown generally at 30), a second portion (shown generally at 32), and a transition portion (shown generally at 34) disposed between the first portion 30 and second portion 32. The first portion 30 of each flute 28 is disposed generally at a first helix angle $\theta_1$ relative to the central longitudinal axis 12, the second portion 32 of each flute 28 is disposed at a second helix angle $\theta_2$ relative the central longitudinal axis 12, and the transition portion 34 of each flute 28 is disposed at a third helix angle $\theta_3$ relative to the central longitudinal axis 12. Preferably, the first helix angle $\theta_1$ is at or about 30 degrees (+/-2 degrees), the second helix angle $\theta_2$ is in the range of about 15 degrees to about 20 degrees, and the transition helix angle $\theta_3$ is at or about 45 degrees (+/-2 degrees). In any case, the third helix angle $\theta_3$ is greater than the first helix angle $\theta_1$, the desirability of such relationship is discussed in further detail below.

As shown in hidden line in FIG. 1, cutting tool 10 further includes a number of coolant passages 40 (two in the illustrated example) defined in the generally cylindrical body 22. Each coolant passage 40 is disposed at a helix angle $\alpha_1$ relative to the central longitudinal axis. Preferably, the helix angle $\alpha_1$ of the coolant passages 40 is at or about the same angle as the first helix angle $\theta_1$ of the flutes 28. It is to be readily appreciated that such arrangement provides for each coolant passage 40 to run generally parallel alongside the first portion 30 of a respective flute 28.

As shown in FIGS. 1 and 3, each coolant passage 40 comprises an opening 42 disposed generally in or about the transition portion 34 of a corresponding flute 28. In other words, as a result of the difference between the first helix angle $\theta_1$ of the first portion 30 of each flute (and the helix angle $\alpha_1$ of the coolant passages 40) and the transition angle $\theta_3$ of the transition portion 34, each coolant passage 40 breaks out of the drill body 22 generally in or near the transition portion 34, thus providing coolant to the periphery (not numbered) and cutting tip 20 of the cutting tool 10 without requiring any EDM processing of the cutting tool 10.

From the previous description, a person of ordinary skill in the art would readily appreciate that there are a number of ways that a cutting tool 10 according to the present invention may be formed. As an example, a PCD nib may be brazed onto a rod having coolant passages formed therein and disposed at a helix angle $\alpha_1$ of, for example, without limitation, 30 degrees. After such brazing has been completed, a differential flute of varying helix angles would then be ground. Such differential flute including an optimized second helix angle $\theta_2$ near the cutting point 20, and a third helix angle $\theta_3$ that "transitions" to cut off the coolant holes 40 at a location generally axially above the cutting lips (not numbered) of the cutting tool 10.

It is to be appreciated that the present invention provides a number of benefits over known PCD drills. Such benefits include, for example, without limitation, the ability to use existing coolant hole rods in manufacturing PCD drills, does not require a central coolant hole (thus stronger), eliminates any need for EDM, requires less processing time (thus lower costs), and the differential helix can be readily adjusted to produce favorable dynamic behavior.

While a specific embodiment of the invention has been described in detail, it will be appreciated by those skilled in the art that various modifications and alternatives to the details provided herein could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A cutting tool for performing hole-cutting operations on a workpiece when the cutting tool is rotated about a central longitudinal axis, the cutting tool comprising:
    a generally cylindrical body having a first end structured to be mounted to a machine tool and an opposite second end structured to engage and perform cutting operations on the workpiece, at least a portion of the second end being formed from a PCD material;
    a number of coolant passages defined in the generally cylindrical body, each coolant passage of the number of coolant passages disposed at a first helix angle relative to the central longitudinal axis;
    a number of flutes formed in the generally cylindrical body, each flute of the number of flutes having a first portion at or about the first end of the generally cylindrical body, a second portion at or about the second end of the generally cylindrical body, and a transition portion disposed therebetween,
    wherein the first portion of each flute is disposed generally at the first helix angle relative to the central longitudinal axis, the second portion of each flute is disposed generally at a second helix angle relative the central longitudinal axis, and the transition portion of each flute is disposed generally at a third helix angle relative to the central longitudinal axis,
    wherein the third helix angle is greater than the first helix angle, and
    wherein each coolant passage of the number of coolant passages terminates at an opening disposed at or about the transition portion of a corresponding flute of the number of flutes.

2. The cutting tool of claim 1 wherein the number of flutes comprises two flutes and the number of coolant passages comprises two coolant passages.

3. The cutting tool of claim 1 wherein the first helix angle comprises an angle of about 30 degrees.

4. The cutting tool of claim 1 wherein the third helix angle comprises an angle of about 45 degrees.

5. The cutting tool of claim 1 wherein the second helix angle comprises an angle in the range of about 15 degrees to about 20 degrees.

6. A cutting tool for performing hole-cutting operations on a workpiece when the cutting tool is rotated about a central longitudinal axis, the cutting tool comprising:

a generally cylindrical body having a first end structured to be mounted to a machine tool and an opposite second end structured to engage and perform cutting operations on the workpiece, at least a portion of the second end being formed from a PCD material;

a number of flutes formed in the generally cylindrical body, each flute of the number of flutes having a first portion at or about the first end of the generally cylindrical body, a second portion at or about the second end of the generally cylindrical body, and a transition portion disposed therebetween, a number of coolant passages defined in the generally cylindrical body, each coolant passage of the number of coolant passages extending from the first end and terminating at an opening at or about the transition portion of a corresponding flute of the number of flutes and having a portion disposed at a first helix angle relative to the central longitudinal axis;

wherein the first portion of each flute is disposed generally at the first helix angle relative to the central longitudinal axis, the second portion of each flute is disposed generally at a second helix angle relative the central longitudinal axis, and the transition portion of each flute is disposed generally at a third helix angle relative to the central longitudinal axis, and wherein the third helix angle is greater than the first helix angle.

* * * * *